No. 775,753. PATENTED NOV. 22, 1904.
W. B. KEIGHLEY.
VEHICLE WHEEL.
APPLICATION FILED MAY 12, 1904.
NO MODEL. 2 SHEETS—SHEET 1.
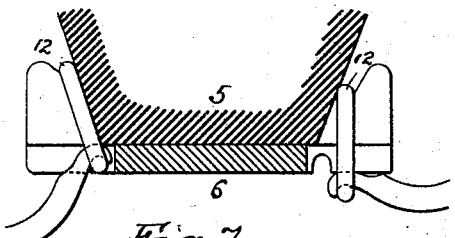
Fig. 7.
Fig. 1.
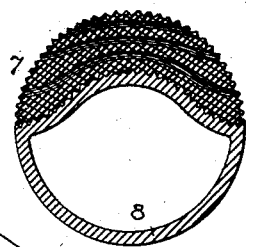
Fig. 8.
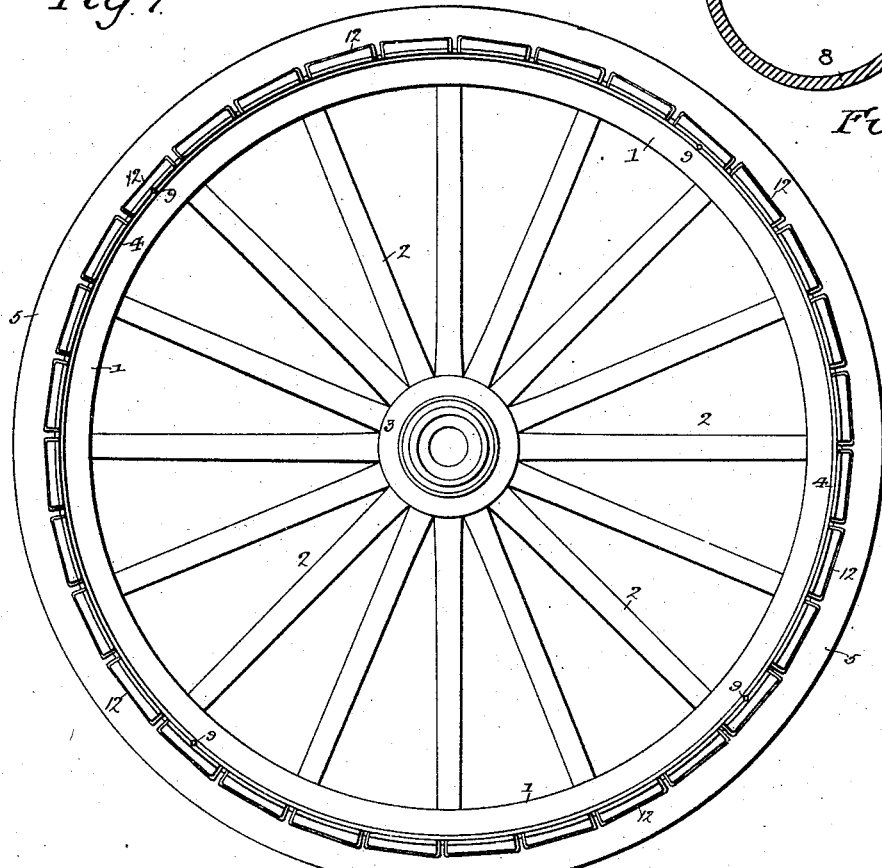
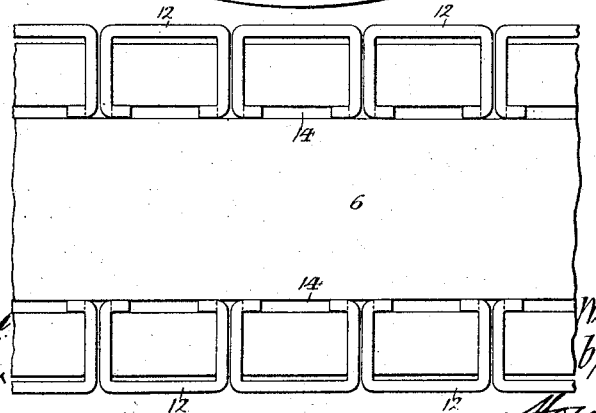
Fig. 3.
Witnesses:
Inventor:
William B. Keighley,
by his Attorneys, No. 775,753. PATENTED NOV. 22, 1904.
W. B. KEIGHLEY.
VEHICLE WHEEL.
APPLICATION FILED MAY 12, 1904.
NO MODEL. 2 SHEETS—SHEET 2.
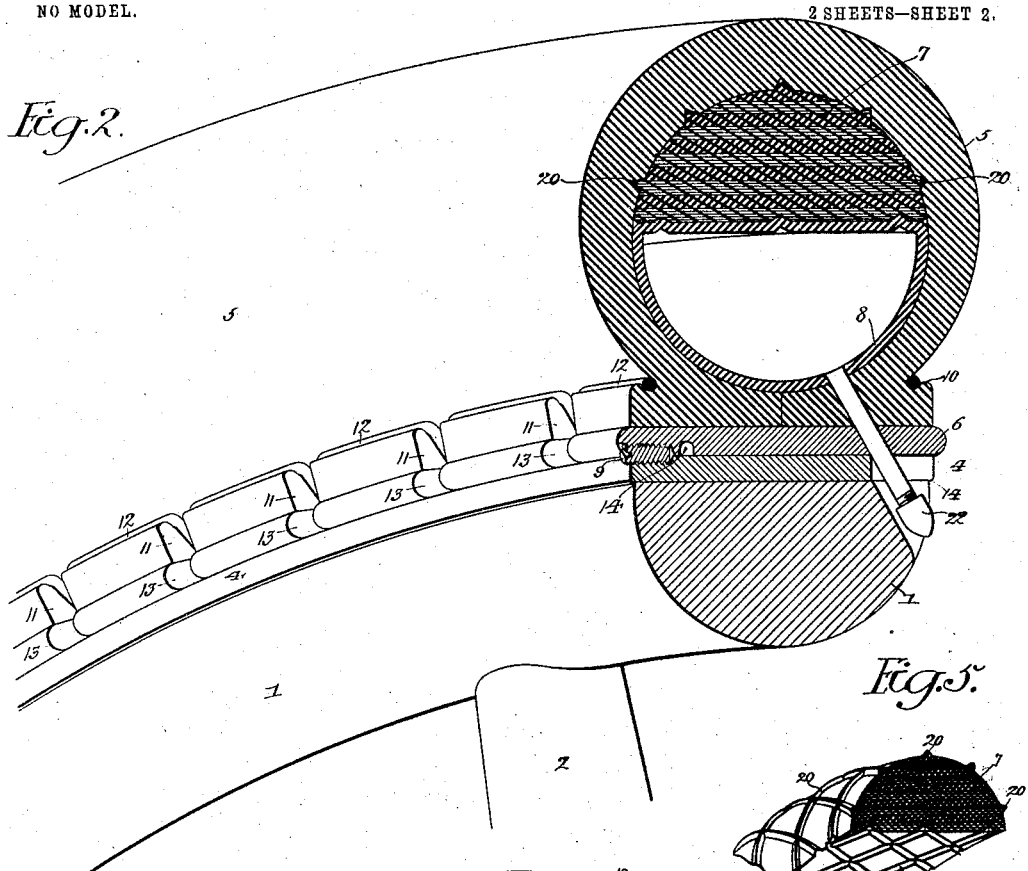
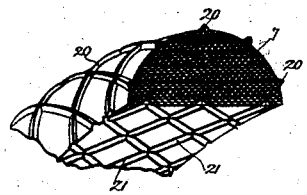
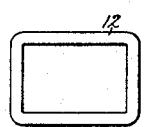
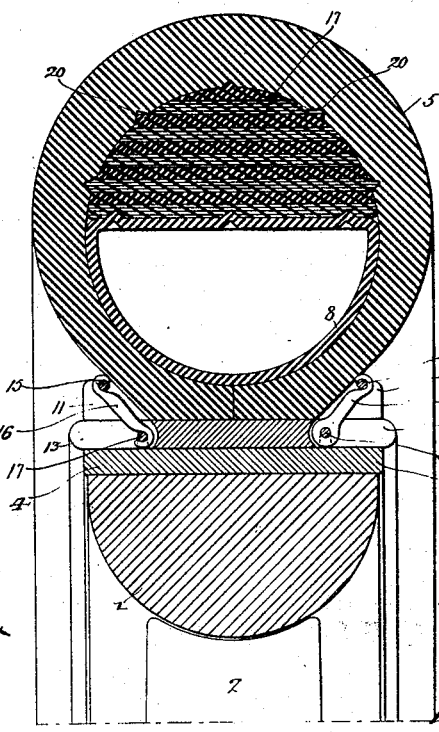

No. 775,753. Patented November 22, 1904.

UNITED STATES PATENT OFFICE.

WILLIAM B. KEIGHLEY, OF VINELAND, NEW JERSEY.

VEHICLE-WHEEL.

SPECIFICATION forming part of Letters Patent No. 775,753, dated November 22, 1904.

Application filed May 12, 1904. Serial No. 207,637. (No model.)

*To all whom it may concern:*

Be it known that I, WILLIAM B. KEIGHLEY, a citizen of the United States, and a resident of Vineland, New Jersey, have invented certain Improvements in Wheels for Vehicles, of which the following is a specification.

One object of my invention is to provide an ordinary carriage-wheel with an elastic tire which can be readily applied or removed without deflating the tire in case an inflated tire is employed, a further object being to permit ready access to the interior of the tire or tire-casing when desired and an equally ready restoration of the tire to operative condition, and still further objects being to prevent puncturing of the air-tube of the tire and to prevent creeping of the tire on the wheel or of any member of the tire in respect to the others.

These objects I attain in the manner hereinafter set forth, reference being had to the accompanying drawings, in which—

Figure 1 is a side view of a wheel with detachable pneumatic tire constructed in accordance with my invention. Fig. 2 is a view, partly in section and partly in perspective, of part of the rim and tire of the wheel. Fig. 3 is a view of the under side of part of the detachable tire. Fig. 4 is a sectional view of the tire and rim, illustrating certain modifications in the construction of the fastening devices for the elastic tire or tire-casing. Fig. 5 is a perspective view of part of one of the members of the elastic tire. Fig. 6 is a side view of one of the fastening devices for the tire, and Figs. 7 and 8 are views illustrating further modifications of the invention.

1 represents the rim or felly, 2 the spokes, and 3 the hub, of an ordinary wooden wheel with metal tire 4, one object of my invention being to so apply an elastic tire to such a wheel that it can be readily applied or removed, although certain features of the invention are applicable to wheels in general.

Mounted upon the tire 4 is the tire constituting the subject of my invention, which consists of four members—viz., the outer hollow elastic tire or tire-casing 5, (hereinafter for convenience referred to as the "outer tire,") an inner metallic ring for tire 6, (hereinafter referred to as the "base-tire,") a cushion 7 filling the outer portion of the chamber within the outer tire, and an inflatable tube 8, filling the inner portion of said chamber.

The base-tire 6 fits snugly to the ordinary wheel-tire 4, but can be readily slipped over the same from either side of the wheel and can be prevented from crawling or creeping on said tire by means of a number of locking screws or bolts 9, adapted to threaded openings, each formed partly in the tire 4 and partly in the base-tire 6, as shown in Fig. 2. The outer tire 5 is in the present instance split longitudinally throughout its inner portion, so that its base can be expanded laterally for the insertion of the cushion 7 and inflatable tube 8, and each side of the base of said outer tire 5 is longitudinally undercut, as shown at 10 in Fig. 2, and transversely recessed at frequent intervals, as shown at 11 in said figure, the longitudinally undercut portions of the base of the tire receiving the upper members of a series of pivoted retaining-loops 12, whose side members or legs are adapted to the recesses 11 and also to similar slots or recesses 13, formed in the base-tire 6, the inner ends of said retaining-loops being bent toward each other, as shown in Fig. 3, and adapted to bearings in longitudinal grooves 14, formed in the inner side of the base-tire 6. In some cases it may be preferable to use unbroken loops, as shown, for instance, in Fig. 6. The retaining-loops 12 can be readily swung up into position to engage the undercut portions 10 of the outer tire 5, as shown in Fig. 2, so as to firmly retain said tire in position upon the base-tire 6, or they can be swung down, so as to release said outer tire 5, as shown in Fig. 3, when it is desired to remove the same from the base-tire 6 or to gain access to the interior of said tire 5, or, if desired, a reverse construction may be adopted, as shown in Fig. 7, the loops being sprung out of the grooves 14 by means of a suitable implement in order to release the outer tire, and being forced or pushed under the base-tire in applying the same, both operations of course being performed when the base-tire is removed from the tire 4.

Instead of using the series of independent loops, such as described, for the purpose of retaining the outer tire 5, the undercut portions of said tire may receive a wire 15, such as shown in Fig. 4, and this wire may be engaged by the upper ends of a series of duplex hooks 16, which are adapted to the slots 11 and 13, the lower ends of said hooks engaging a wire 17, contained in the groove 14 of the base-tire 6, as shown at the left-hand side of Fig. 4, or, if desired, hooks 18 may be permanently hung to said wire 17, but detachably engaged with the wire 15, as shown at the right-hand side of Fig. 4. In either case the downward and outward swinging of the hooks will release the wire 15 from their control, and hence will permit of the ready separation of the tires 5 and 6. The open ends of the hooks 16 may face in either direction and the wire 17 may, if desired, be secured to the base-tire 6.

The degree of inflation of the inner tube 8 of the outer tire 5 determines the elasticity of said tire. Hence the degree of elasticity of the tire can be readily regulated by a corresponding regulation of the inflation of the tube 8, the mass of cushioning material 7 between the inflated tube 8 and the outer portion of the tire 5 providing an effective guard against the puncturing of said tube 8, because of the practical impossibility of forcing a nail or other pointed object through such a mass of material as is represented by the thickened outer portion of the tire 5 and the cushion 7 backing the same.

Any desired material may be employed for the cushion 7, the material which I prefer being alternate layers of rubber and canvas. The cushion has diagonally-disposed ribs 20 upon its outer or convex face and diagonal grooves 21 upon its inner or flat face, as shown in Fig. 5, and the inner face of the outer tire 5 is so grooved that when the tube 8 is expanded the ribs of the cushion will engage with the grooves of the tire, and any crawling or displacing of the cushion in respect to the tire, either longitudinally or transversely, will be effectively prevented. Engagement of the outer portion of the tube 8 with the grooves in the flat face of the cushion 7 will also serve to retain the said tube 8 in its proper position in respect to the other members of the tire. Either ribs or grooves may be used upon either face of the cushion, as desired.

Creeping or crawling of the outer tire 5 upon the wheel is prevented by the loops or hooks which engage with the base of said tire and are also in engagement with the base-tire 6, the latter being retained in its proper position upon the tire 4 by means of the locking bolts or screws 9. The inner tube 8 may, if desired, be made of the form shown—that is to say, with one semicircular and one flat side, or both sides of the inner tube may be of convex form, as shown in Fig. 8, the cushion 7 being of crescent shape.

Any of the usual means may be employed for inflating the tube 8, Fig. 2 showing the usual capped nipple 22, which passes through an opening in the inner portion of the tire 5, through a corresponding opening in the base-tire 6, through a slot in the tire 4, and through a recess in one side of the rim 1 of the wheel.

By the use of the flat base-tire 6 and the means of fastening the outer tire 5 thereto, which I have shown and described, all projecting rims extending up along the sides of the outer tire are avoided, and hence there is no risk of cutting the outer tire by contact of the same with such rims when it is deflated. This feature of my invention can, therefore, be applied to single-tube tires or even to solid tires, as well as to the specific form of tire which I have shown and described, and many of the present forms of tire having base-lugs can be readily adapted for use with my improved form of fastening.

Having thus described my invention, I claim and desire to secure by Letters Patent—

1. A wheel-tire having a flat base, and an outer elastic tire, having projecting lugs secured to said flat base by means of swinging clips, substantially as specified.

2. The combination, in a wheel-tire, of an outer elastic tire having undercut and transversely-slotted base portions, a base-tire upon which said outer elastic tire is seated, and pivoted and swinging retainers for said elastic tire occupying the transversely-slotted portions of the outer tire, substantially as specified.

3. The combination, in a wheel-tire, of an outer elastic tire having undercut and transversely-slotted base portions, a similarly slotted base-tire upon which said outer elastic tire is seated, and pivoted and swinging retainers for said elastic tire occupying the transversely-slotted portions of both tires, substantially as specified.

4. The combination in a wheel-tire, of an outer elastic tire, a base-tire upon which said outer tire is seated, said elastic tire having undercut bases, and both the elastic tire and the base-tire having transverse slots, and the base-tire also having slots or grooves in its inner face, and retaining-clamps having outer portions engaging the undercut portions of the elastic tire, inner portions adapted to the slots or grooves of the base-tire, and side portions adapted to the transverse slots of the elastic tire and base-tire, substantially as specified.

5. An elastic wheel-tire, consisting of an outer hollow tire having internal ribs or grooves, a cushion occupying the outer portion of the chamber within the hollow tire and grooved or ribbed to engage the ribs or grooves of said hollow tire, and an inflatable tube occupying the inner portion of the chamber within the hollow tire, and having bearing upon said cushion, substantially as specified.

6. An elastic wheel-tire, consisting of an outer hollow tire, a cushion occupying the outer portion of the chamber within the hollow tire, and an inflatable tube occupying the inner portion of the chamber within the hollow tire, and having bearing upon said cushion, said bearing-surface being ribbed or grooved, substantially as specified.

7. An elastic wheel-tire, consisting of an outer hollow tire having internal ribs or grooves, a cushion occupying the outer portion of the chamber within the hollow tire and grooved or ribbed to engage the ribs or grooves of said hollow tire, and an inflatable tube occupying the inner portion of the chamber within the hollow tire, and having bearing upon said cushion, said bearing-surface being also ribbed or grooved, substantially as specified.

8. An elastic wheel-tire, consisting of an outer hollow tire having diagonally-disposed internal ribs or grooves, a cushion occupying the outer portion of the chamber within said hollow tire, and having diagonal grooves or ribs for engaging with those of the hollow tire, and an inflatable tube occupying the inner portion of the chamber within the tire, and having bearing upon said cushion, substantially as specified.

9. An elastic wheel-tire, consisting of an outer hollow tire, a cushion occupying the outer portion of the chamber within said hollow tire, and an inflatable tube occupying the inner portion of the chamber within the tire, and having bearing upon said cushion, said bearing-surface being diagonally ribbed or grooved, substantially as specified.

10. An elastic wheel-tire, consisting of an outer hollow tire having diagonally-disposed internal ribs or grooves, a cushion occupying the outer portion of the chamber within said hollow tire, and having diagonal grooves or ribs for engaging with those of the hollow tire, and an inflatable tube occupying the inner portion of the chamber within the tire, and having bearing upon said cushion, said bearing-surface being also diagonally ribbed or grooved, substantially as specified.

In testimony whereof I have signed my name to this specification in the presence of two subscribing witnesses.

WILLIAM B. KEIGHLEY.

Witnesses:
   HARRY C. DOWN,
   W. S. DUNGAN.